June 22, 1937.  H. R. PRESCOTT ET AL  2,084,561
SEISMOPHONE
Filed July 1, 1935
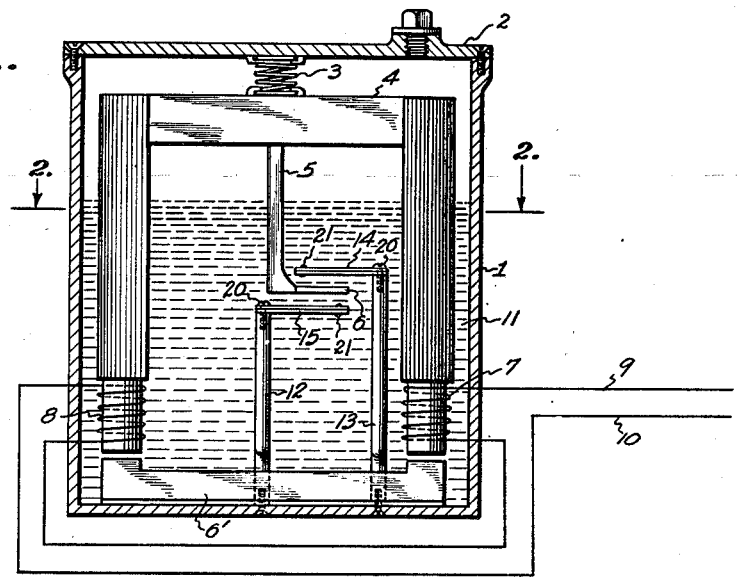
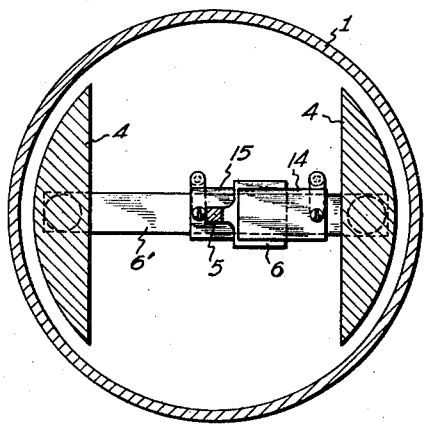
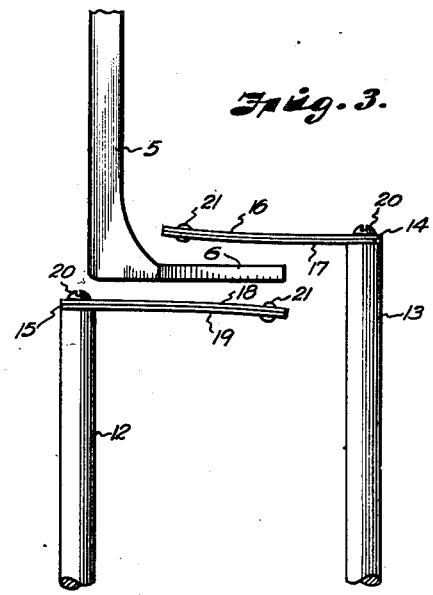
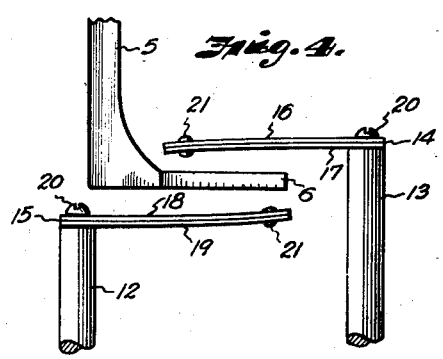
INVENTOR
Harold R. Prescott
and Kenneth C. Woodyard
ATTORNEY

Patented June 22, 1937 2,084,561

UNITED STATES PATENT OFFICE 2,084,561

SEISMOPHONE

Harold R. Prescott and Kenneth C. Woodyard, Ponca City, Okla., assignors to Continental Oil Company, Ponca City, Okla., a corporation of Delaware Application July 1, 1935, Serial No. 29,306

3 Claims. (Cl. 177—352)

Our invention relates to seismophones and more particularly to an improved seismophone construction.

We consider any device for responding to elastic waves in the earth, which responses can be converted into electrical manifestations in phase with the elastic waves, as a seismophone. Seismophones in general consist of a mass suspended in a frame, the construction being such that the frame tends to move with the earth, while the mass tends to remain stationary in space. The relative motion between the frame and the mass may be utilized to cut lines of magnetic force and thus induce a potential which may be utilized in any manner well known to the art.

In order to prevent undue amplitude in the relative motion of the frame and the mass, damping means are resorted to. As a damping medium, oil is used. Damping is a necessary provision. Without it, the mass system, after receiving a vibration, will superimpose the natural frequency of its motion on to the motion of the earth and will continue to vibrate at its own natural frequency. This natural frequency is far removed from the frequencies which are being recorded.

It is known in the art, further, that the best damping value is seven tenths of the critical amount.

Oil has many advantages as a damping medium and requires very little additional space in the mechanism of the seismophone. Oil will vary in viscosity depending on the temperature. A seismophone must undergo temperature variations even during one day's operations. During a season, it will be obvious that greater temperature variations will occur.

There is no oil or other fluid of high viscosity which would be suitable for damping, which is entirely free of viscosity variations which are a function of the temperature. The changes of viscosity as a function of the temperature are known as the "viscosity index". No oil is known with an absolutely level viscosity index.

As a result of viscosity variations in oil or other damping fluid which might be used, it follows that, if the seismophone were properly damped at a given temperature, as for example, 75° F., and operations were conducted at temperatures in the neighborhood of 40° F. there would be a great over-damping as a result of the viscosity increase in the damping medium, occasioned by the reduction of the temperature. Likewise, if operations were conducted at temperatures in the neighborhood of 90° F. the reduction of viscosity in the damping medium would result in an under-damping of the instrument.

An over-damped instrument is insensitive. An under-damped instrument tends to vibrate at its own natural frequency, thus contributing motion which is highly objectionable in a seismophone. Either an overdamped or an under-damped instrument causes a time phase change in the lag between the motion of the earth and the mass system of the seismophone as compared to the action of the instrument with a desirable amount of damping. This time phase change causes a time error which results in inaccuracy of results obtained when making geophysical explorations.

The use of a light grade of oil or other damping fluid with a small damping gap will not correct the difficulty. A light oil or a damping fluid of low initial viscosity has, as a rule, a more level viscosity index. In order to obtain the desired amount of damping, however, when using a lower viscosity fluid, it is necessary to employ a very close or very small damping gap. In practice, the use of a small damping gap is not feasible or desirable since the instruments receive rough use and the gap will not maintain its proper value. A very small change in the adjustment of the damping gap will introduce a serious error.

One object of our invention is to provide a damped seismophone which will automatically compensate itself for temperature variations.

Another object of our invention is to provide a seismophone of such construction that it will be properly damped, irrespective of temperature changes.

Other and further objects of our invention will appear from the following description.

In the accompanying drawing which forms part of the instant specification and is to be read in conjunction there with and in which like reference numerals are used to indicate like parts in the various views:

Figure 1 is a sectional elevation of a schematic view of one mode of carrying out our invention.

Figure 2 is a sectional view taken along the line 2—2 of Figure 1.

Figure 3 is a schematic view of a detail showing the arrangement of parts at lower temperatures.

Figure 4 is a schematic view of a detail showing the arrangement of parts at higher temperatures.

In general, our invention contemplates the provision of a damping foot arranged between a damping gap which is filled with oil or other fluid, with provision for varying the gap in accordance with temperature. The construction is such that, when the temperature is lowered and the viscosity of the damping fluid is thus increased, that the damping gap is increased. Likewise, the construction allows the decrease of the damping gap in response to an increase in temperature to compensate for the reduction in the viscosity of the damping fluid.

More particularly referring now to the drawing, we have shown a seismophone diagrammatically in which a casing 1 is provided with a cover plate 2 from which, by means of a spring or other resilient member 3, a permanent magnet 4 is suspended. The permanent magnet 4 is of large mass and thus possesses considerable inertia. Attached to and rigidly connected with magnet 4 is a supporting projection 5, the lower end of which carries a damping blade or damping foot 6. Secured to the bottom of the casing 1 is a member 6' made of magnetic material adapted to provide a return path for the magnetic flux flowing through magnet 4. Suitable windings 7 and 8 may be wound upon the poles of magnet 4, or upon member 6', if desired. As the member 6' moves relative to the magnet 4, which tends to remain stationary in space, variations in the flow of magnetic flux will occur, thus cutting the windings of coils 7 and 8 and inducing an electromotive force which is conducted by wires 9 and 10 to suitable recording devices. The interior of casing 1 contains oil 11 or other suitable damping fluid. Supporting members 12 and 13 support blades 14 and 15, which are of bimetallic construction. The blades 14 and 15 define the gap in which damping foot 6 acts. Each of the blades 14 and 15 is constructed of two metals firmly bonded together, having different linear coefficients of expansion.

Referring to Figure 3, it will be observed that blade 14 is a bimetallic strip, the upper portion 16 of which is of different metal than the lower portion 17. Upper portion 16 is made of a metal having a fairly high linear coefficient of expansion, as for example German silver, bronze, silver, or copper. Lower portion 17 of blade 14 is made of a metal having a comparatively low linear coefficient of expansion, as for example platinum or more desirably "invar" which is an alloy composed of 63.8 percent iron and 36.2 percent nickel, and has an extremely low linear coefficient of expansion. Upper portion 18 of blade 15 is made of a metal similar to lower portion 17 of blade 14, that is, of "invar", while lower portion 19 of blade 15 is made of the same metal as the upper portion 16 of blade 14. The blades are secured to the respective supporting members in any suitable manner, as for example by machine screws 20 which will serve to bind the component parts of the blades at their supported ends. The outer ends of the blades may be secured by a rivet 21. It is to be understood, of course, that the component metals of the blades may be bonded in any suitable manner. The blades 14 and 15 are so constructed that, at ordinary temperatures, they will assume the position shown in Figure 1. When the temperature increases, the copper for example of the portions 16 and 19 of blades 14 and 15 will expand more than the invar of which portions 17 and 18 of the blades are composed. When this occurs, a bending of the blades will take place, as shown in Figure 4. The amount of bending will depend upon the variation in temperature and the difference in the linear coefficients of expansion of the two metals used. As pointed out above, when the temperature increases, the viscosity of the oil decreases. The decrease in the damping gap which is provided by the flexing of the damping blades as shown in Figure 4 will compensate for the loss in viscosity of the damping medium, due to the temperature rise.

Similarly, when the temperature drops, the copper of the upper portion 16 of blade 14 and the lower portion 19 of blade 15 will contract more than the invar of portions 17 and 18, flexing the arms to the position shown in Figure 3, thus increasing the gap to compensate for the increase in viscosity of the damping medium.

It will be observed that, by a proper selection of the area of damping blades 14 and 15, with respect to the area of the damping foot 6, the proper initial selection of the damping gap, the proper initial selection of the damping fluid, and the proper selection of the metals which go to make up damping blades 14 and 15, the system may be quite readily arranged to compensate for viscosity variation of the damping fluid to give a seismophone which will remain at desirable damping regardless of temperature variations which may be encountered in service.

It will be observed that there will be a linear coefficient of expansion of arms 12 and 13 which, due to the fact that these arms are of different length, will introduce a slight error. Accordingly, these arms may be made of invar or other material having a low linear coefficient of expansion so that this error may be negligible.

It will be observed that many changes may be made within the spirit of our invention. For example, the supporting members 12 and 13 may be made of bimetallic construction so that they will flex to provide changes in the damping gap.

The arrangement we have shown has an important advantage over a single damping foot. If a single, bimetallic damping blade were used, the initial adjustment of damping foot 6 would be critical as the blade to which the foot is closest will contribute the largest share of damping. When two bimetallic blades are used, the sum of the two effects is nearly constant, irrespective of the initial position of damping foot 6.

It will be observed that we have accomplished the objects of our invention. We have provided a seismophone of such construction that the damping value is constant over the temperature range encountered in use. The damping value of our construction is such that it is a function of the temperature of equal and opposite effect to the function of temperature represented by viscosity changes. In other words, the change of damping occasioned by variations in viscosity of the damping fluid are compensated for by changes in the value of the damping gap.

It will be understood that certain features and sub-combinations are of utility and may be employed without reference to other features and sub-combinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, what we claim is:

1. In a seismophone, a housing, a mass, elastic means for mounting said mass for vibration, a damping fluid in said housing, a pair of bimetallic blades spacedly mounted within said housing to form a semi-confined space with fluid positioned in said space, a damping foot carried by said mass and positioned between said blades, the construction of said bimetallic blades being such that upon a rise in temperature said blades will flex to increase the resistance to movement of the fluid between said blades, and upon a drop in temperature the blades will flex to decrease the resistance to movement of fluid between said plates.

2. In a seismophone, a housing, a mass, elastic means for mounting said mass for vibration within said housing, damping fluid in said housing, means forming a damping gap in said housing, said means comprising in part thermostatic operating means, a damping foot carried by said mass and positioned in said damping gap, the construction being such that said thermostatic means will vary said damping gap inversely as a function of the temperature.

3. In a seismophone, a housing, a mass, elastic means for mounting said mass for vibration within said housing, a damping fluid in said housing, means actuated by vibration of said mass for moving said damping fluid and means responsive to temperature for varying the resistance to fluid movement inversely as the temperature.

HAROLD R. PRESCOTT.
KENNETH C. WOODYARD.